United States Patent
Caprihan et al.

(10) Patent No.: US 8,347,268 B2
(45) Date of Patent: Jan. 1, 2013

(54) AUTOMATED PERFORMANCE MONITORING

(75) Inventors: Gaurav Caprihan, Bangalore (IN); Nikhil Venugopal, Secunderabad (IN); Pratik Kumar, Delhi (IN)

(73) Assignee: Infosys Limited, Bangalore (IN)

( * ) Notice: Subject to any disclaimer, the term of this patent is extended or adjusted under 35 U.S.C. 154(b) by 1434 days.

(21) Appl. No.: 11/871,875

(22) Filed: Oct. 12, 2007

(65) Prior Publication Data
US 2008/0092122 A1     Apr. 17, 2008

(30) Foreign Application Priority Data
Oct. 13, 2006   (IN) ............................ 1900/CHE/2006

(51) Int. Cl.
*G06F 9/44*     (2006.01)
(52) U.S. Cl. .................. 717/127; 714/E11.202; 700/108
(58) Field of Classification Search ................... 700/174, 700/108; 717/127; 714/E11.202
See application file for complete search history.

(56) References Cited

U.S. PATENT DOCUMENTS

| | | | | |
|---|---|---|---|---|
| 5,544,082 A * | 8/1996 | Garcia-Duarte et al. | ...... | 713/321 |
| 5,664,106 A * | 9/1997 | Caccavale | ...... | 709/224 |
| 5,819,033 A * | 10/1998 | Caccavale | ...... | 709/224 |
| 5,872,913 A * | 2/1999 | Berry et al. | ...... | 714/47.2 |
| 5,920,689 A * | 7/1999 | Berry et al. | ...... | 714/47.2 |
| 6,018,759 A * | 1/2000 | Doing et al. | ...... | 718/108 |
| 6,738,813 B1 * | 5/2004 | Reichman | ...... | 709/224 |
| 6,757,681 B1 * | 6/2004 | Bertram et al. | ...... | 1/1 |
| 7,107,339 B1 * | 9/2006 | Wolters | ...... | 709/224 |
| 2001/0003205 A1 * | 6/2001 | Gilbert | ...... | 713/320 |
| 2002/0049920 A1 * | 4/2002 | Staiger | ...... | 713/340 |
| 2002/0087897 A1 * | 7/2002 | Cline et al. | ...... | 713/300 |
| 2006/0089890 A1 * | 4/2006 | Campbell | ...... | 705/34 |
| 2007/0112953 A1 * | 5/2007 | Barnett | ...... | 709/224 |
| 2007/0150571 A1 * | 6/2007 | Haga et al. | ...... | 709/223 |

OTHER PUBLICATIONS

NRG Global, "Response Time Monitoring, Alerting and Reporting Software," Chroniker Version 4, <http://www.nrgglobal.com/products/Chroniker_datasheet.pdf>, 2 pages (accessed Oct. 4, 2007).
TeamQuest, "How to Do Capacity Planning," White Paper TQ-WP23 Rev. B, <http://www.teamquest.com/pdfs/whitepaper/tqwp23.pdf>, 16 pages (2003).
Microsoft, "Prescriptive Architecture, Chapter 17—Tuning.NET Application Performance," <http://msdn2.microsoft.com/en-us/library/ms998583(d=printer).aspx>, 45 pages (May 2004).

* cited by examiner

*Primary Examiner* — Phillip H Nguyen
(74) *Attorney, Agent, or Firm* — Klarquist Sparkman, LLP (57) ABSTRACT

Performance tracking of computing systems can be provided by monitoring, determining performance states, and displaying health information. Capacity planning recommendations can be provided by monitoring performance of a software application, determining a plurality of performance state transitions of the software application, and, based on the transitions, making capacity planning recommendations. Performance state transitions can be selected from a set of transitions between four possible quadrant states. Performance of a software application can be categorized into one of the four possible quadrant states from. Capacity planning recommendations can be provided by a capacity planning framework. The framework can comprise a performance monitoring module for monitoring performance of software applications, a quadrant tracking module for determining performance state transitions, and a capacity planning module for making capacity planning recommendations based on the transitions. Capacity planning recommendations can be automated to provide an end-to-end capacity planning solution.

15 Claims, 9 Drawing Sheets

SOFTWARE 980 FOR TECHNOLOGY
DESCRIBED IN EXAMPLE(S)

AUTOMATED PERFORMANCE MONITORING

BACKGROUND

System performance is one of the most important criteria used in determining business success. With ever increasing reliance on software applications, such as IT applications, businesses cannot afford downtime or poor performance.

Many technologies and tools have been developed to monitor system performance. These technologies and tools provide users, such as system administrators, with large amounts of performance data across the entire technology stack, from the underlying Infrastructure resource metrics up through to application level runtime parameters. The burden is then on the user, such as the system administrator, to sift through this often voluminous performance data to pick out tell-tale symptoms of potential performance bottlenecks and accordingly decide on an appropriate course of action. For example, if a system administrator is monitoring disk utilization of a server, one of the decisions that the system administrator would need to make is regarding the health of the disk and when to provision for an upgrade. Although such monitoring and prompt decision making by a user are crucial from a performance perspective, they can be extremely time consuming. In addition, the quality of the result depends on the experience of the user reviewing the performance data and making decisions regarding future capacity needs.

Therefore, there exists ample opportunity for improvement in technologies related to performance monitoring and capacity management.

SUMMARY

A variety of technologies related to performance monitoring and capacity management can be applied. In some implementations, performance is categorized into one of four performance quadrant states, as follows: poor quality of service and low system stress, good quality of service and low system stress, good quality of service and high system stress, and poor quality of service and low system stress.

A method for performance tracking of computing systems can be provided by monitoring performance of the computing system, determining performance states based on results of the performance monitoring, and displaying health information for the computing system based on the performance states.

A method for providing capacity planning recommendations can be provided by monitoring performance of a software application, determining a plurality of performance state transitions based on results of the performance monitoring, and making one or more capacity planning recommendations based on the plurality of performance states. The performance state transitions can be selected from a set of performance state transitions between four possible quadrant states for the software application.

A capacity planning framework can be used for making capacity planning recommendations. The framework can comprise a performance monitoring module configured to monitor performance of software applications. For example, performance monitoring can include monitoring performance metrics related to application responsiveness and throughput as well as performance metrics related to hardware resources such as disk usage, CPU usage, I/O, etc. The framework can also comprise a quadrant tracking module configured to track performance of the software application. For example, the quadrant tracking module can determine performance state transitions between four performance quadrants (e.g., four pre-defined performance quadrants). The framework can further comprise a capacity planning module configured to provide capacity planning recommendations based on the performance state transitions determined by the quadrant tracking module.

Capacity planning recommendations can be provided based upon performance states and transitions. For example, performance of a software application (or multiple software applications and/or computing devices) can be monitored over time. Based on the monitoring, performance states, selected from four possible quadrant states (e.g., pre-determined quadrant states), can be determined. Based on the performance states, performance state transitions (e.g., between each sequential pair of performance states) can be determined. From the performance state transitions, a most frequently occurring performance state transition can be identified. Capacity planning recommendations can be determined based on the most frequently occurring performance state transition.

The foregoing and other features and advantages will become more apparent from the following detailed description, which proceeds with reference to the accompanying figures.

DETAILED DESCRIPTION OF EXEMPLARY EMBODIMENTS

Example 1

Exemplary Performance Monitoring

In any of the examples herein, performance monitoring refers to monitoring performance of computing systems. In some implementations, monitoring performance of computing systems refers to monitoring performance of one or more software applications. In other implementations, monitoring performance of computing systems refers to monitoring performance of one or more software applications and monitoring performance of one or more computing devices (e.g., servers) upon which the software applications are running or with which the software applications interact. In yet other implementations, monitoring performance of computing systems refers to monitoring performance of one or more computing devices (e.g., servers). In general, performance monitoring refers to monitoring performance of software, hardware, or a combination.

Performance monitoring of software applications can comprise monitoring the software itself (e.g., response time of the software) as well as monitoring aspects of computing hardware (e.g., memory and disk usage) upon which the software is running.

Performance monitoring can be used to monitor a variety of metrics related to performance. Some examples of performance monitoring metrics are: CPU utilization, memory utilization, I/O utilization, network activity, server load, hard drive activity, response time, processing efficiency (e.g., transactions per minute), etc.

Example 2

Exemplary Quality of Service

In any of the examples herein, software applications can be monitored to determine quality of service (QoS). In some implementations, quality of service refers to an objective measure of the software application's performance. For example, quality of service can refer to response time and/or throughput (e.g., number of transactions or operations performed per unit time) in addition to other measures of performance.

Example 3

Exemplary Performance States

In any of the examples herein, performance of software applications can be mapped to performance states. Performance state mapping can be used in performance tuning and capacity planning (e.g., used to help make capacity planning recommendations). In a specific implementation, four quadrants are used to classify application performance.

Figure 3:
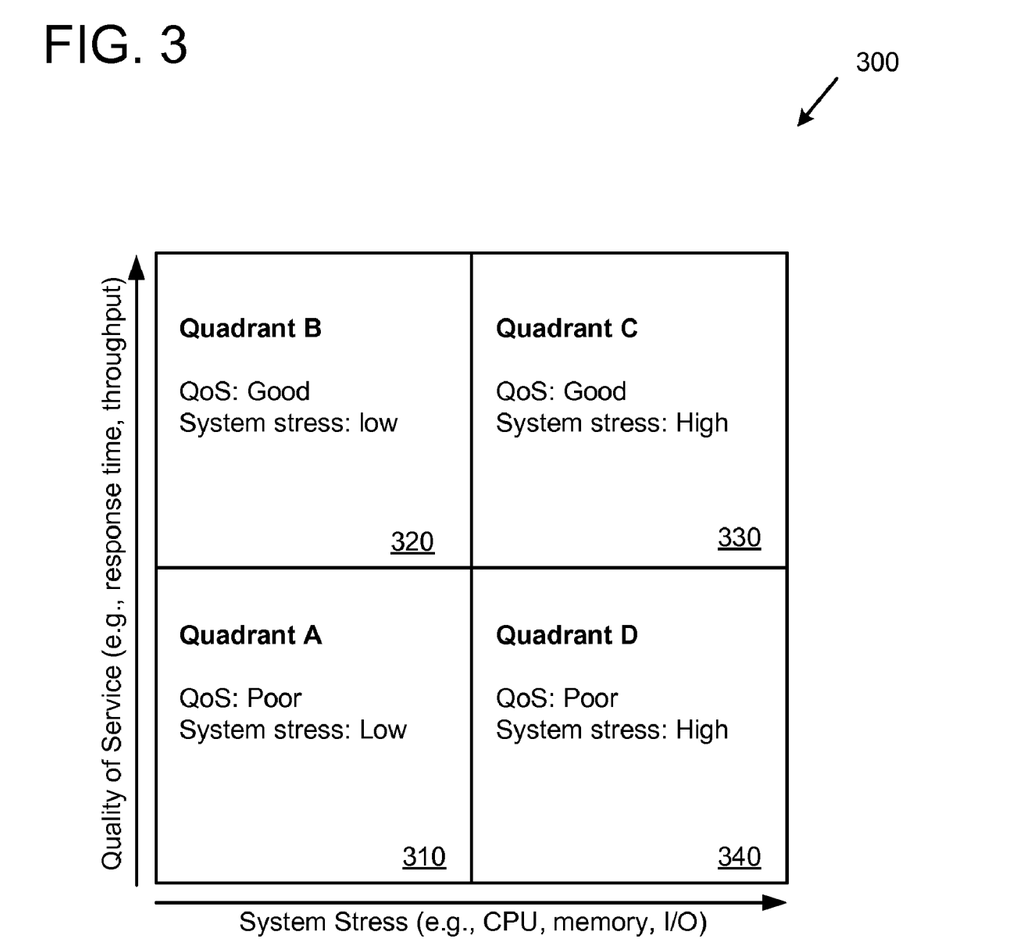
FIG. 3 is a diagram showing an exemplary quadrant for classifying application performance.

FIG. 3 is a diagram 300 showing a quadrant layout for classifying application performance used in a specific implementation. Each of the four quadrants represents a different performance state (e.g., instantaneous performance state).

The quadrants are arranged along an X and a Y axis. The X axis represents increasing system stress (e.g., CPU, memory, I/O), while the Y-axis represents increasing quality of service (e.g., responsiveness and throughput). In the diagram 300, quadrant "A" 310 represents poor quality of service (e.g., poor response times and/or poor throughput) and low system stress. Quadrant "B" 320 represents good quality of service and low system stress. Quadrant "C" 330 represents good quality of service and high system stress. Quadrant "D" 340 represents poor quality of service and low system stress.

In a specific implementation, quadrant "A" 310 is characterized by low resource utilization levels and poor response times and throughputs. An application's performance would typically map in this region either if the application is non-scalable or if the Non-Functional Requirements (NFR) or Service Level Agreements (SLAs) are impractically optimistic. Quadrant "B" 320 is characterized by low resource utilization levels and good response times and throughputs. This is the most desirable quadrant of operation; the application's performance behavior should ideally remain in this quadrant. Quadrant "C" 330 is characterized by high resource utilization levels and acceptable response times and throughputs. A system seen to be resident in this quadrant most of the time clearly needs to be either tuned or upgraded for more capacity. Finally, quadrant "D" 340 is characterized by high resource utilization levels and poor response times and throughputs. This quadrant is indicative of system burn-out; an application would eventually move into this quadrant if appropriate capacity planning activities are not being carried out at appropriate times.

Depending on various factors, such as business requirements and service level agreements, ranges of values can be defined for each of the four quadrants in terms of the metrics to be monitored (e.g., response time, throughput, CPU, I/O, etc.).

Example 4

Exemplary Performance State Transitions

In any of the examples herein, computing system performance, including software application performance (e.g., instantaneous software application performance), can be mapped to quadrant states. Once at least two quadrant states have been mapped, performance state transitions can be determined.

In a specific implementation, software application performance is monitored over time (e.g., over a period of hours or days). On a periodic basis (e.g., every hour), application performance (e.g., instantaneous application performance) can be determined based on performance monitoring. The results of the performance monitoring can be used to map the application performance to one of the four quadrants depicted in FIG. 3.

Example 5

Exemplary Capacity Planning Recommendations

In any of the examples herein, capacity planning recommendations can be made based upon performance states and/or performance state transitions. For example, specific performance state transitions (e.g., a transition from quadrant "B" to quadrant "C") can be associated with transition conditions (e.g., actual or possible causes for the transition) and capacity planning recommendation. In a specific implementation, capacity planning recommendations are recommendations intended to return performance to quadrant "B."

Example 6

Exemplary Performance Tracking

In any of the examples herein, performance of computing systems can be tracked using performance states. For example, performance of a computing system can be monitored over a period of time. Based on results of the performance monitoring, performance states can be determined (e.g., a performance state for each interval of a monitoring cycle, such as each hour of a 12 hour monitoring cycle). In a specific implementation, the performance states are selected from the four quadrant performance states described below with reference to FIG. 3.

The performance states can be used for a variety of purposes, such as displaying information regarding the performance (or health) of the computing system or making capacity planning recommendations. For example, displaying an indication of health of the computing system can comprise displaying various hardware and/or software applications of the computing system along with an indication of health (e.g., "good performance" or "poor performance," or a color-coded indication such as green for good performance and red for poor performance).

In a specific implementation, where the four quadrant performance states are used, the indication of health is based on the quadrants. For example, if a software application operates primarily in quadrant "C," a display can indicate poor performance (e.g., by directly displaying the quadrant, or by displaying an indication of what operation in the quadrant indicates, in the case of quadrant "C": good QoS and high system stress).

Example 7

Exemplary Capacity Planning Framework

Figure 1:
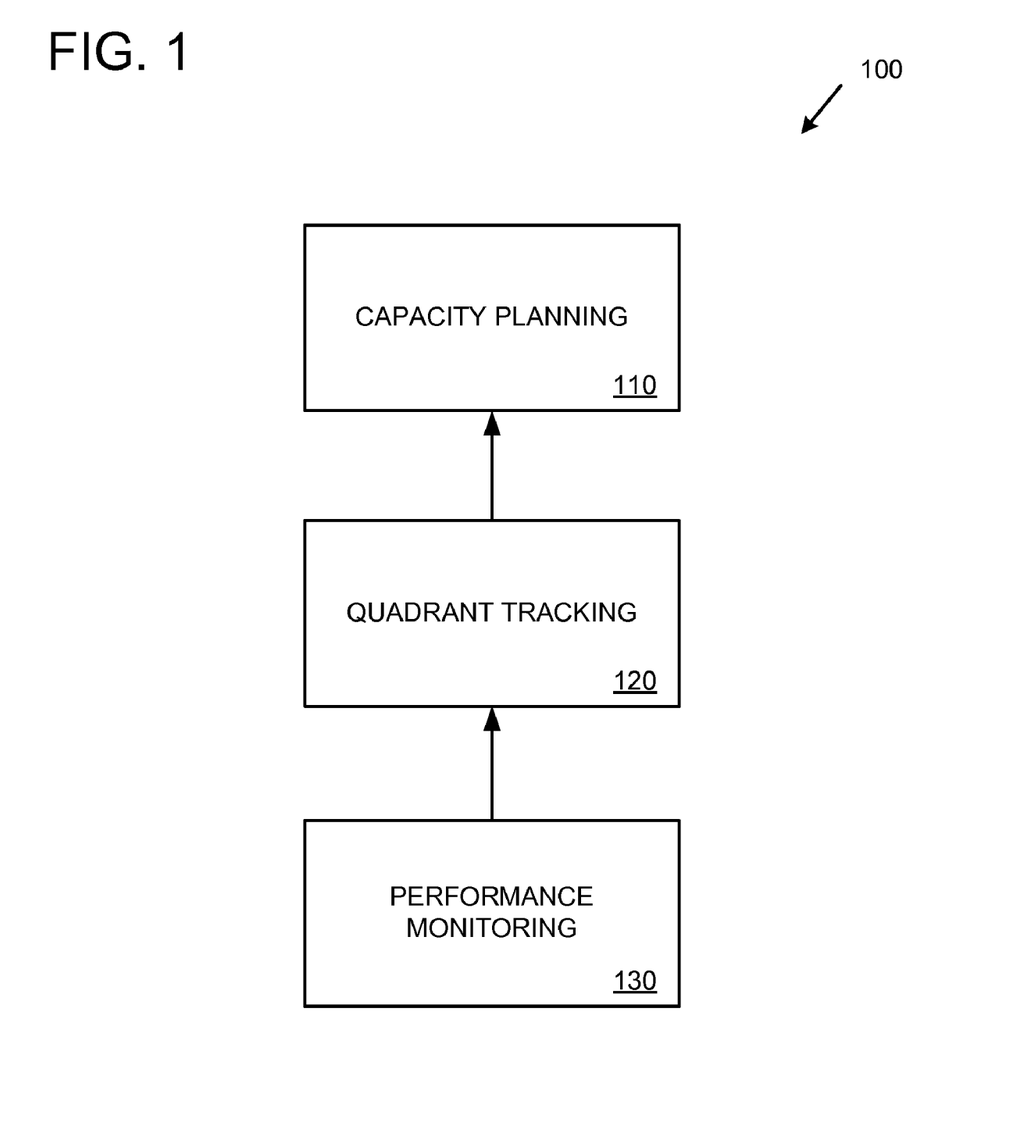
FIG. 1 is a diagram showing an exemplary capacity planning framework.

FIG. 1 shows an exemplary capacity planning framework 100. For example, the framework 100 can be used for making automated capacity planning recommendations.

The framework 100 includes a performance monitoring module 130. The performance monitoring module 130 is configured to monitor performance of software applications, including the hardware upon which the software applications are running.

The framework 100 includes a quadrant tracking module 120. The quadrant tracking module 120 is configured to track performance of software applications over time. Specifically, the quadrant tracking module 120 is configured to receive performance data from the performance monitoring module 130 and, based on the received performance data, determine performance state transitions. For example, the performance state transitions can be determined based on performance states (e.g., instantaneous performance states) of the software application.

The framework 100 includes a capacity planning module 110. The capacity planning module 110 is configured to make capacity planning recommendations. The capacity planning recommendations relate to various types of remedies intended to fix performance related issues. For example, a capacity planning recommendation can be a recommendation to augment hardware resources (e.g., add additional CPU and memory resources). The capacity planning recommendation can be a long-term recommendation (e.g., that the additional CPU and memory resources are anticipated to be needed in approximately 2 weeks).

In a specific implementation, the performance monitoring module 130 provides monitoring statistics of software applications on a periodic basis (e.g., monitoring response time and server load every 5 minutes). On another periodic basis, the performance monitoring module 130 provides monitoring statistics to the quadrant tracking module 120 (e.g., every hour the performance monitoring module 130 averages the response time and server load and provides the averaged results to the quadrant tracking module 120). The quadrant tracking module 120 determines a performance state of the software application based on the received statistics (e.g., based on the received average response time and average server load). The determined performance state is the performance state for the monitoring period (e.g., for the hour). Upon each subsequent monitoring period, the quadrant tracking module 120 determines another performance state of the software application based on received statistics for that period (e.g., for that hour). For each pair of performance states (e.g., the first and second, the second and third, and so on), the quadrant tracking module 120 determines a performance state transition. At the end of a monitoring cycle (e.g., 12 hours), the quadrant tracking module 120 provides the most frequently occurring performance state transition of the monitoring cycle to the capacity planning module 130. The capacity planning module 130 then makes capacity planning recommendations based on the most frequently occurring performance state transition (e.g., by accessing a database of performance state transitions and associated transition conditions and recommendations).

The example framework 100 can be automated. For example, the framework 100 can be implemented in software and provide the functionality described in this section without user intervention. For example, capacity planning software implementing the framework 100 can monitor performance, determine performance states and transitions, and make capacity planning recommendations without a user having to manually interpret performance results and decide upon a course of action.

The framework can be implemented in software running on a computing device (e.g., a computer such as a desktop, laptop, or server computer, or another type of computing device such as a specialized performance monitoring hardware).

Example 8

Exemplary System for Making Capacity Planning Recommendations

Figure 2:
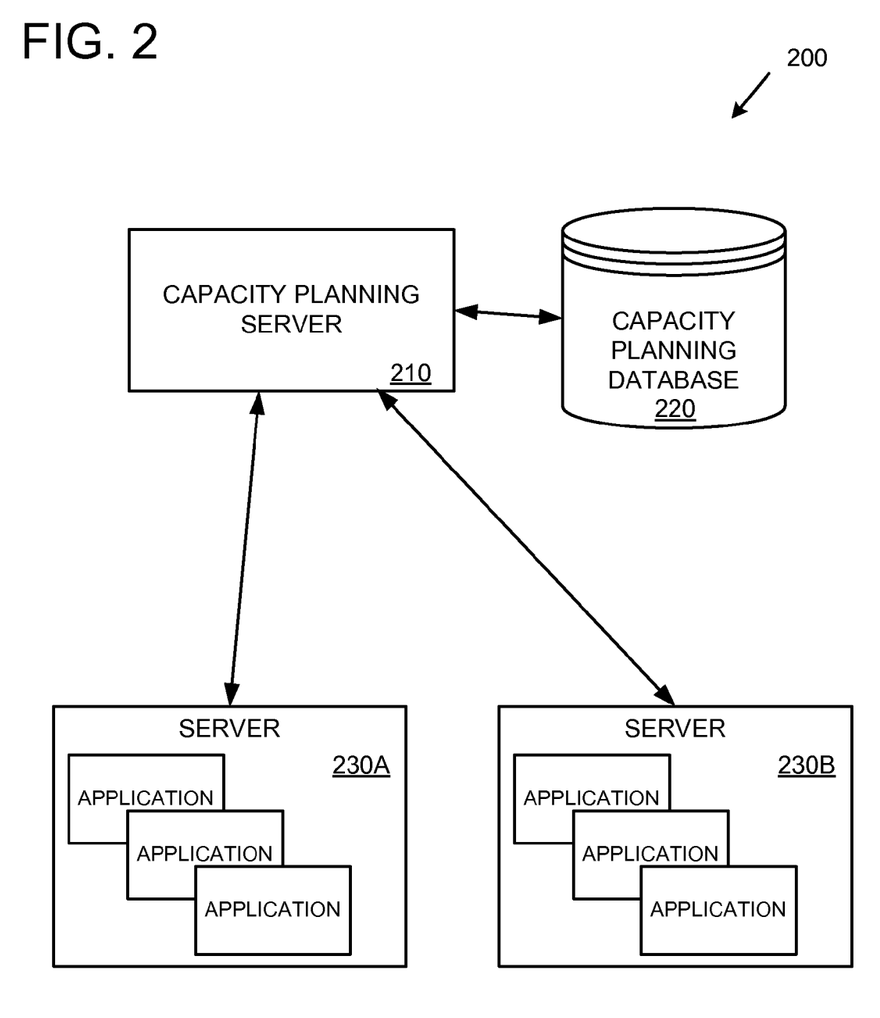
FIG. 2 is a diagram showing an exemplary system for making capacity planning recommendations.

FIG. 2 shows an exemplary system 200 for making capacity planning recommendations. For example, the system 200 can be a capacity planning system of a business or organization. The system 200 can be used to provide automated capacity planning recommendations to users (e.g., system administrators) of the business or organization.

The system includes a capacity planning server 210. For example, the capacity planning server 210 can run software implementing the capacity planning framework depicted in FIG. 1. The capacity planning server 210 monitors performance of applications running on one or more servers (e.g., servers 230A and 230B).

The system includes a capacity planning database 220. The capacity planning database 220 stores information related to performance state transitions (e.g., performance state transition conditions and associated capacity planning recommendations). The information in the capacity planning database 220 is used by the capacity planning server 210 when making capacity planning recommendations.

In a specific implementation, the capacity planning server 210 runs software for monitoring performance of software applications running on one or more servers (e.g., applications running on servers 230A and 230B). Based on results of the performance monitoring software, the capacity planning server 210 determines performance states and transitions. Based on the performance state transitions (e.g., the most frequently occurring performance state transition), the capacity planning server 210 makes capacity planning recommendations based on information from the capacity planning database 220.

Example 9

Exemplary Monitoring Scenario

Figure 4:
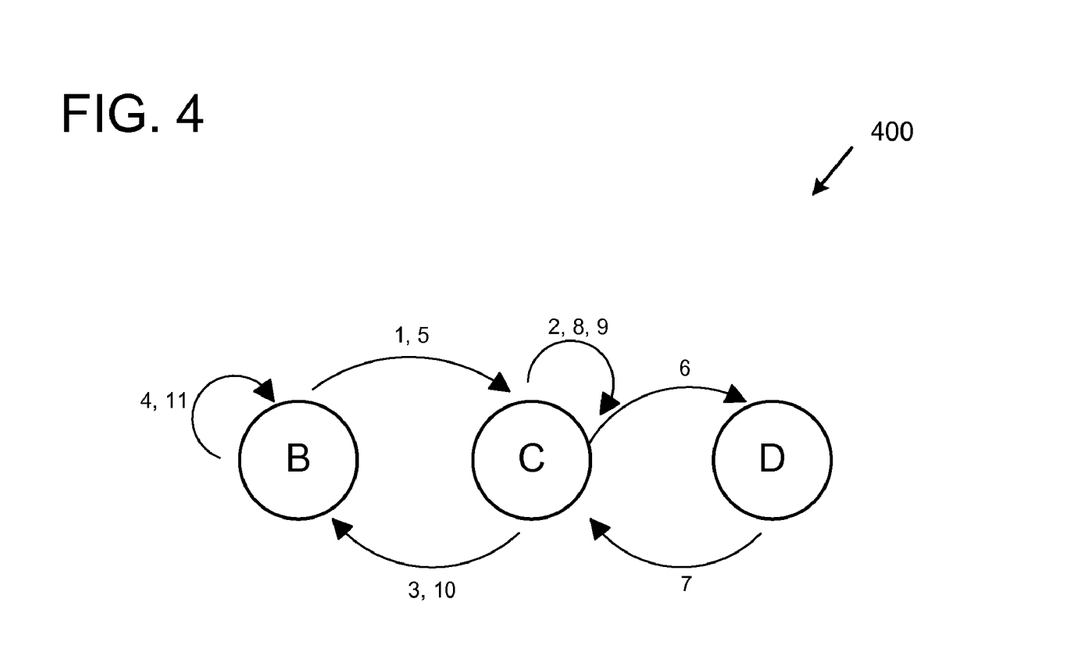
FIG. 4 is a diagram showing exemplary performance state transitions of a software application.

FIG. 4 shows an example state diagram 400 using the quadrant performance states described above with reference to FIG. 3. The example diagram 400 is generated from hypothetical results of a monitored software application over a monitoring cycle (e.g., 12 hours). The results produce the following states: B, C, C, B, B, C, D, C, C, C, B, and B (e.g., one state per hour). The example diagram 400 maps these states and their transitions. For example, the first two states, B and C, correspond to the transition B→C (transition number "1" in the example diagram 400). Analysis of the states and transitions reveals that the most commonly occurring performance state transition is C→C, with three transitions. Based on the most commonly occurring performance state transition, capacity planning recommendations can be made (e.g., capacity planning recommendations intended to return performance primarily to state "B").

Example 10

Exemplary Method for Providing Automated Capacity Planning Recommendations

Figure 5:
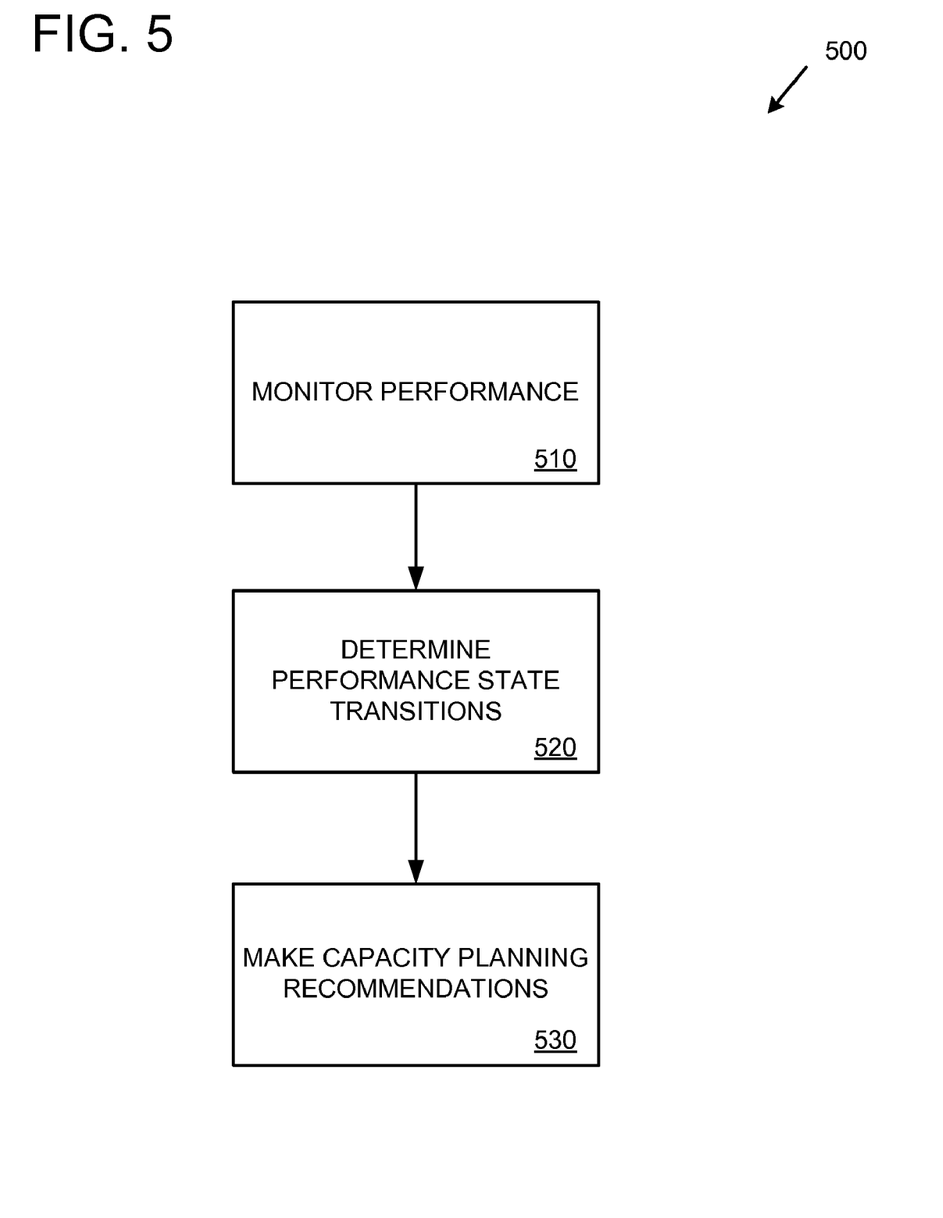
FIG. 5 is a flowchart showing an exemplary method for providing automated capacity planning recommendations.

FIG. 5 shows an exemplary method 500 for providing automated capacity planning recommendations. At 510, performance of a software application is monitored. Monitoring performance of the software application can also comprise monitoring performance of the hardware upon which the software application is running.

At 520, performance state transitions are determined based on results of the performance monitoring. In a specific implementation, a plurality of performance states are determined. The performance states are selected from the four quadrant performance states described above with reference to FIG. 3.

At 530, one or more capacity planning recommendation are made. In a specific implementation, the capacity planning recommendations are made based on one or more frequently occurring performance state transitions (e.g., based on the most frequently occurring performance state transition). The capacity planning recommendations can be long-term recommendations (e.g., recommendations for resources expected to be needed some time in the future, such as one or three months from now).

The example method 500 can be automated. For example, the method can be implemented by software and/or hardware and run without user intervention to provide an end-to-end capacity planning solution.

Figure 6:
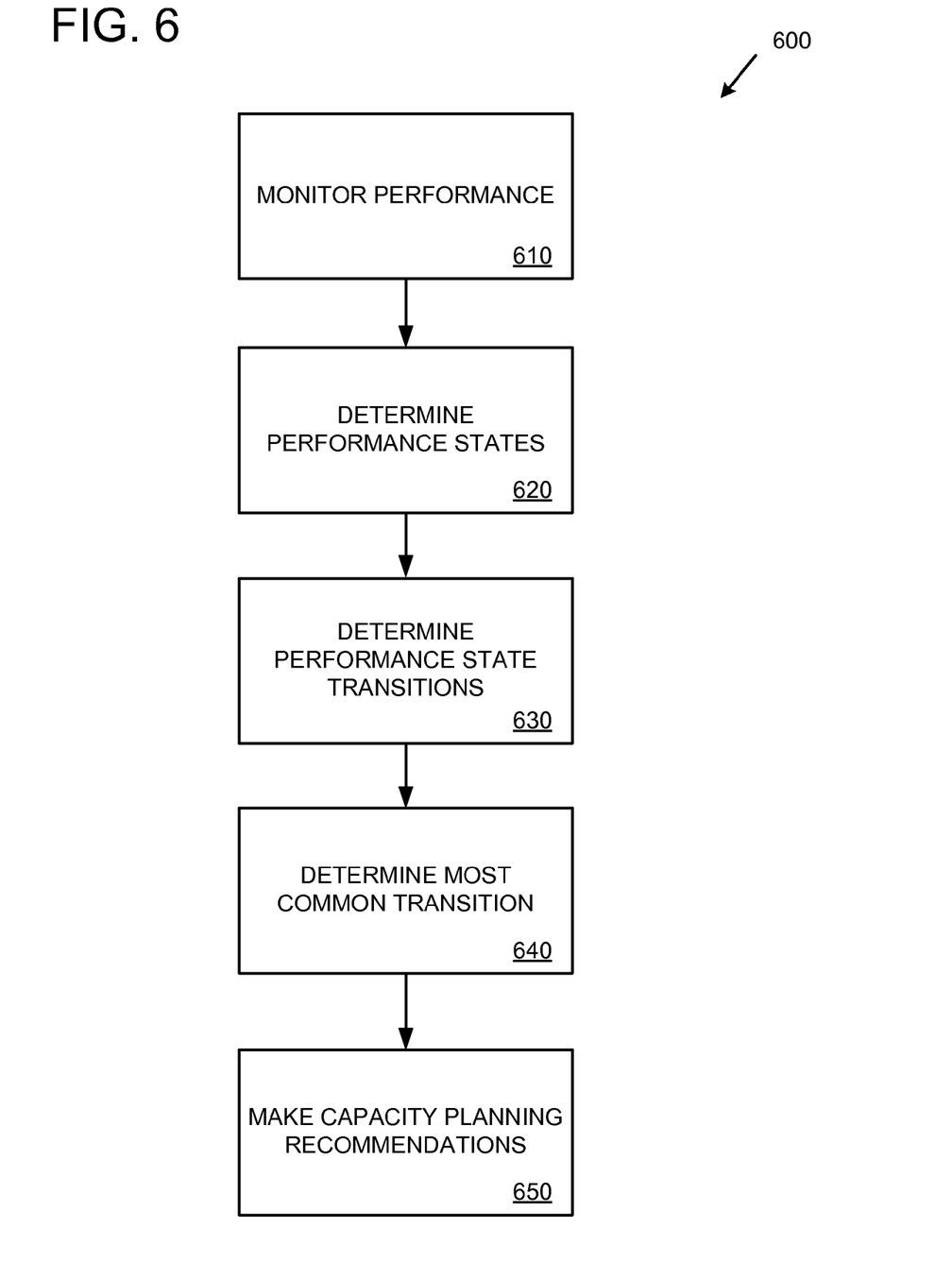
FIG. 6 is a flowchart showing an exemplary method for providing automated capacity planning recommendations.

FIG. 6 shows another exemplary method 600 for providing automated capacity planning recommendations. At 610, performance of a software application is monitored over a period of time. Monitoring performance of the software application can also comprise monitoring performance of the hardware upon which the software application is running.

The period of time over which the application is monitored can vary. For example, if a more accurate estimation of the application's performance is desired, the period of time can be greater (e.g., days or weeks). If, however, a less accurate estimation of performance will be sufficient, the period of time can be shorter (e.g., hours). In some implementations, the period of time is user-configurable. In addition to the period of time, which can be called a monitoring cycle, monitoring times can be specified. A monitoring time refers to an interval for gathering performance statistics. For example, if the monitoring cycle is 12 hours, statistics can be gathered each hour. Depending on the resolution required, the monitoring time can be set accordingly (e.g., every minute, every hour, every 6 hours, etc.). In some implementations, the monitoring time is user-configurable.

At 620, performance states of the software application are determined based on results of the performance monitoring. In a specific implementation, the performance states are the quadrant performance states described above with reference to FIG. 3. For example, if the monitoring cycle is 12 hours, and performance data is generated each hour (e.g., averaged from statistics collected every 5 minutes for that hour), 12 performance states can be determined, one for each hour of the monitoring cycle.

At 630, performance state transitions are determined based on the performance states. For example, if there are 12 performance states, then 11 performance state transitions are determined, one transition for each sequential pair of performance states (e.g., transition between the first and second state, transition between the second and third state, and so on). In a specific implementation, there are 16 possible transitions, corresponding to transitions between the four quadrant states and self transitions.

In a specific implementation, the performance state transitions are stored in data structures (e.g., called quadlets). The data structures comprise additional information regarding the transition, such as transition conditions (e.g., possible transition conditions) and capacity planning recommendations (e.g., possible capacity planning recommendations).

At 640, a most frequently occurring performance state transition, of the performance state transitions 630, is determined. Alternatively, more than one frequent performance state transition can be determined (e.g., if there is a tie between more than one transition).

At 650, capacity planning recommendations are made based on the most frequently occurring performance state transition 640 (or multiple frequently occurring performance state transitions). In a specific implementation, the capacity planning recommendation is made based on possible capacity planning recommendations associated with the transition (e.g., associated with the transition in a data structure).

Example 11

Exemplary User Interface of Capacity Planning Tool

In any of the examples herein, a software tool can be provided for implementing capacity planning technologies. For example, the software tool can be used to configure settings (e.g., monitoring times and monitoring cycles), select applications and/or servers to monitor, and display results (e.g., to a system administrator or IT manager).

Figure 7:
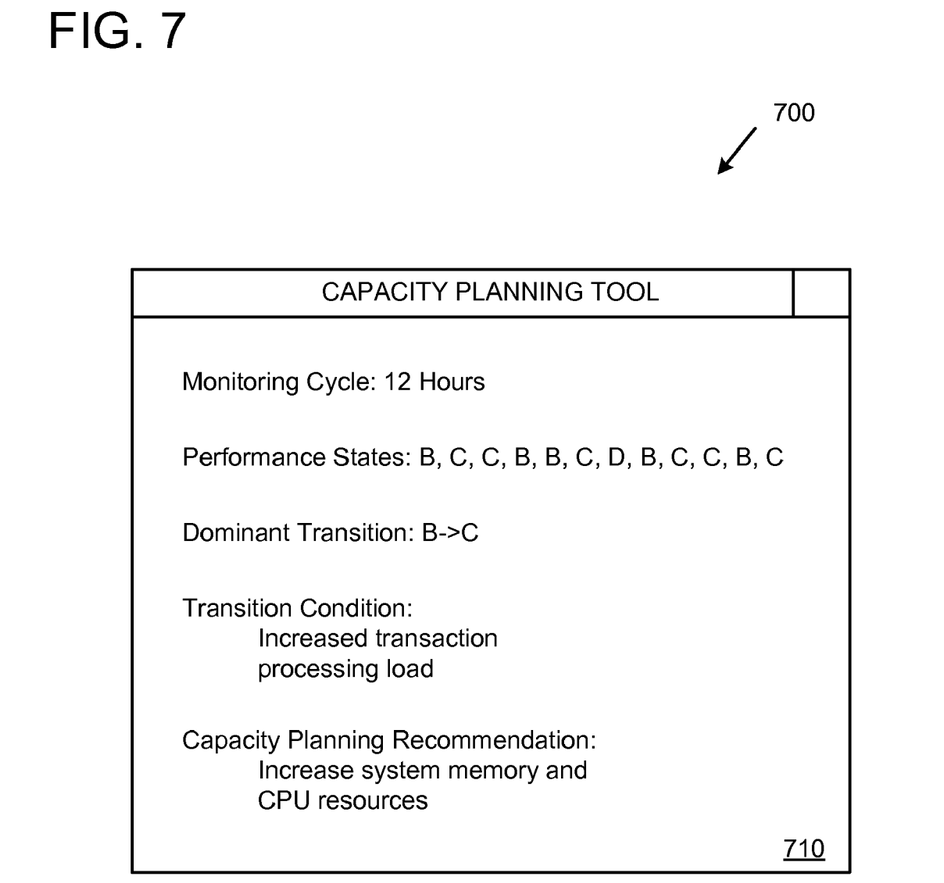
FIG. 7 is a diagram showing an exemplary user interface of a capacity planning tool.

FIG. 7 shows an exemplary user interface 700 of a capacity planning tool. The user interface 700 depicts example results. As depicted in the user interface 700, one or more software applications have been monitored for 12 hours resulting in 12 performance states. The most frequently occurring performance state transition (the dominant performance state transition) is B→C, which occurs four times. Based on the most frequently occurring performance state transition, B→C, transition conditions are displayed. These transition conditions provide an indication of the reason (or reasons) for the transition. As depicted in the user interface 700, the reason for the transition from B→C is an increase in transaction processing load. Also based on the most frequently occurring performance state transition, B→C, capacity planning recommendations are displayed. As depicted in the user interface 700, the capacity planning recommendations are to increase system memory and CPU resources.

Example 12

Exemplary Capacity Planning Scenario

This section describes an example hypothetical scenario using the technologies described herein. This example scenario is intended to describe one way the technologies described herein could be implemented, and does not limit the applicability of the technologies to other situations.

Figure 8:
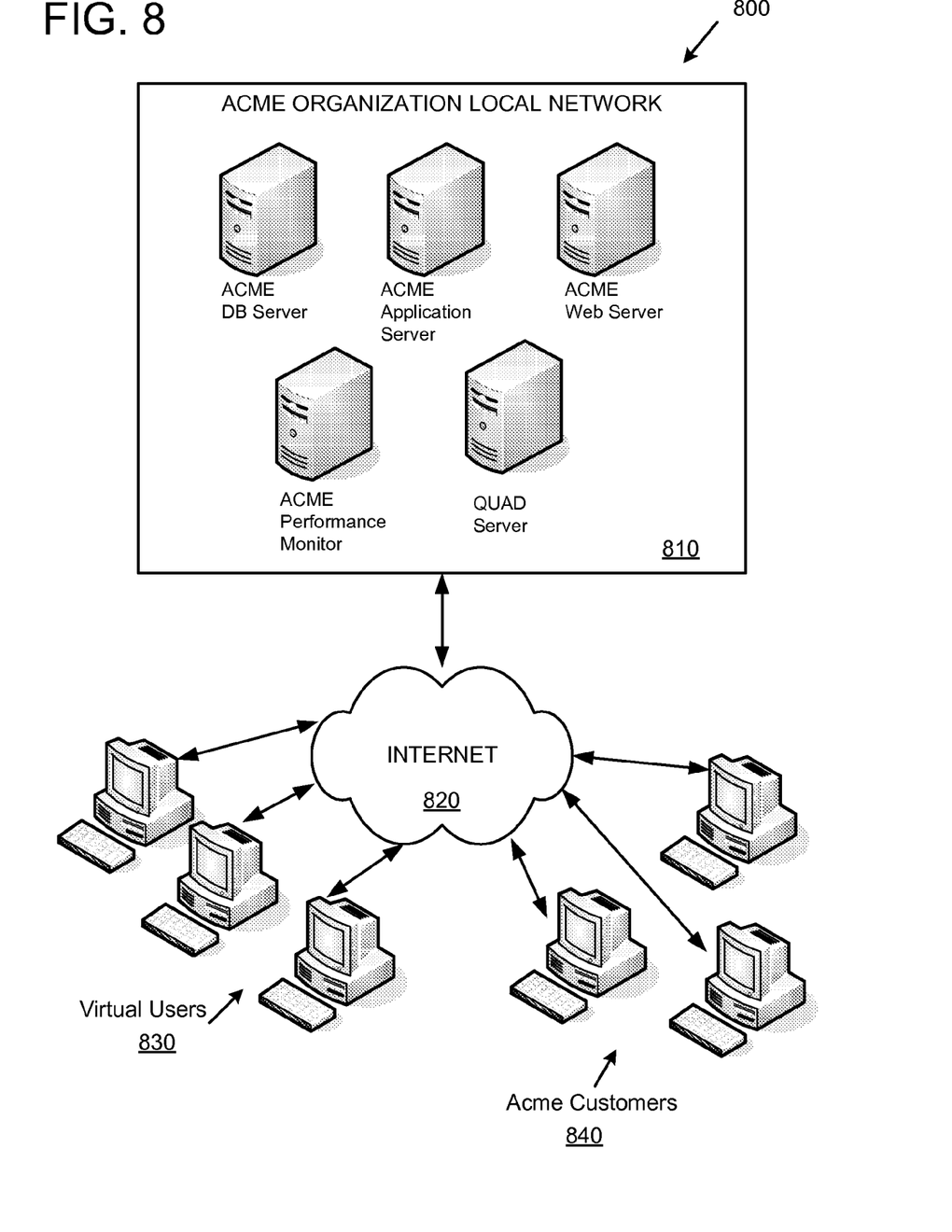
FIG. 8 is a diagram showing an exemplary capacity planning scenario.

In the hypothetical scenario, Acme, Inc. is an apparel company operating an online retail storefront (a website) through which customers buy branded apparel. FIG. 8 shows a simplified view of Acme's local network 810 as well as Acme's connection to the Internet 820 and customers 840 that use Acme's website. Acme runs storefront software (e.g., J2EE applications) on a web server (e.g., a Windows 2003 server), in addition to database software (e.g., Oracle) on a database server and application software on an application server.

Acme has developed a performance monitoring tool running on a performance monitoring server. The performance monitoring tool is capable of monitoring infrastructure, system, and application level performance metrics in real time. The monitored performance data is persisted to a database (e.g., a MySQL database) for later performance assessment and system management. The capacity planning technologies described herein are implemented in software running on a separate server (the quadrant-assisted diagnosis, "QUAD," server depicted in FIG. 8).

Acme has an agreement with a third party website availability monitoring vendor to continuously monitor the health of the Acme website from the Internet. This vendor provides Acme with near real time end user Quality of Service (QoS) metrics such as response time and throughput. In this scenario, the QoS metrics can be provided from the vendor directly to the QUAD server.

The QUAD server contains a database that stores two kinds of metrics. First, the QUAD server stores end-user QoS performance data provided to it by the third-party website monitoring vendor. The QoS performance data is intended to represent QoS experienced by virtual users 830 at various locations throughout the Internet.

Second, the QUAD server stores system level performance metrics from each of the Acme servers (database server, application server, and website server). For example, the Acme performance monitoring server can periodically retrieve the performance data from the various Acme servers. The performance metrics include:

Resource utilization
   Processor, memory, disk, network
Memory
   Pages/sec
   Page input/output/sec
   Page Faults/Sec
System
   Context Switches/second
   Processor Queue Length For each of the Acme servers, the QUAD server maintains a separate context where it tracks the state (i.e., the quadrant state as described above with reference to FIG. 3) of the particular server at regular intervals, typically once every 2 hours. For example, assume performance data is received from the virtual users every two hours, and performance data is received from the Acme servers every 15 minutes. Therefore, for each two-hour period, there would be one sample of response time and throughput and eight samples of server performance data. The eight samples of server performance data would be averaged to produce one data point for each performance metric for the two hour period. Based on the response time and throughput, and the averaged performance data, the performance of each QUAD server would be categorized, for the two-hour period, into one of the four quadrant states.

Based on the quadrant states for each QUAD server over time, health information can be displayed. For example, a system administrator can be presented with a display of each QUAD server along with corresponding performance states for that server. If a QUAD server is primarily operating in a state other than quadrant "B," an alert could be displayed (e.g., a visual indication that the specific server is not operating at an expected level of performance).

Over time (e.g., over a monitoring cycle), a sequence of performance states and corresponding performance state transitions would be generated. The transition (or transitions) most frequently occurring (the dominant transition(s)) and the corresponding quadlet would provide transition conditions and capacity planning recommendations (e.g., recommendations intended to return performance to quadrant "B," at least in the long term).

By monitoring performance over time, and determining performance states and transitions, a database of data structures can be collected (e.g., a quadlet database comprising transitions and their corresponding transition conditions and capacity planning recommendations). The database can be enriched over time. For example, system administrators can manually adjust the data structures, refining transition conditions and corresponding capacity planning solutions (e.g., based on empirical data).

Example 13

Exemplary Computing Environment

Figure 9:
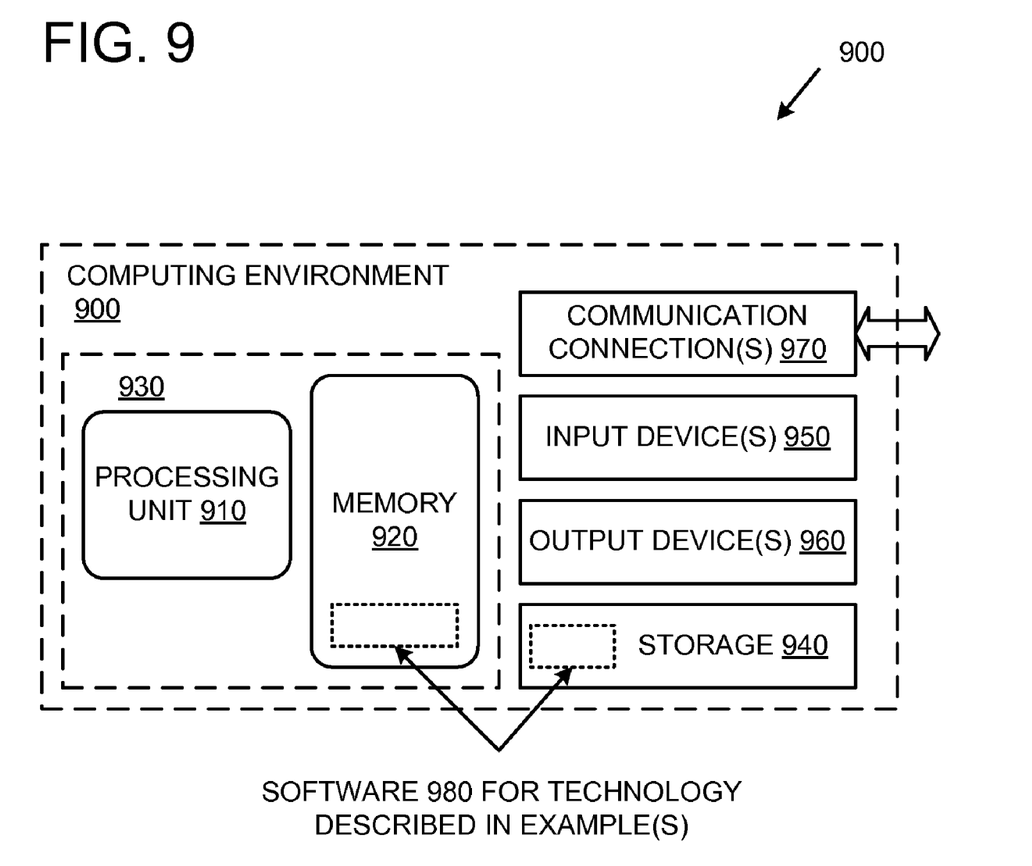
FIG. 9 is a block diagram illustrating an example of a computing environment that can be used to implement any of the technologies described herein.

FIG. 9 illustrates a generalized example of a suitable computing environment 900 in which described embodiments, techniques, and technologies may be implemented. The computing environment 900 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 9, the computing environment 900 includes at least one central processing unit 910 and memory 920. In FIG. 9, this most basic configuration 930 is included within a dashed line. The central processing unit 910 executes computer-executable instructions and may be a real or a virtual processor. In a multi-processing system, multiple processing units execute computer-executable instructions to increase processing power and as such, multiple processors can be running simultaneously. The memory 920 may be volatile memory (e.g., registers, cache, RAM), non-volatile memory (e.g., ROM, EEPROM, flash memory, etc.), or some combination of the two. The memory 920 stores software 980 that can, for example, implement the technologies described herein. A computing environment may have additional features. For example, the computing environment 900 includes storage 940, one or more input devices 950, one or more output devices 960, and one or more communication connections 970. An interconnection mechanism (not shown) such as a bus, a controller, or a network, interconnects the components of the computing environment 900. Typically, operating system software (not shown) provides an operating environment for other software executing in the computing environment 900, and coordinates activities of the components of the computing environment 900.

The storage 940 may be removable or non-removable, and includes magnetic disks, magnetic tapes or cassettes, CD-ROMs, CD-RWs, DVDs, or any other medium which can be used to store information and which can be accessed within the computing environment 900. The storage 940 stores instructions for the software 980, which can implement technologies described herein.

The input device(s) 950 may be a touch input device, such as a keyboard, keypad, mouse, pen, or trackball, a voice input device, a scanning device, or another device, that provides input to the computing environment 900. For audio, the input device(s) 950 may be a sound card or similar device that accepts audio input in analog or digital form, or a CD-ROM reader that provides audio samples to the computing environment 900. The output device(s) 960 may be a display, printer, speaker, CD-writer, or another device that provides output from the computing environment 900.

The communication connection(s) 970 enable communication over a communication medium (e.g., a connecting network) to another computing entity. The communication medium conveys information such as computer-executable instructions, compressed graphics information, or other data in a modulated data signal.

Computer-readable media are any available media that can be accessed within a computing environment 900. By way of example, and not limitation, with the computing environment 900, computer-readable media include memory 920, storage 940, communication media (not shown), and combinations of any of the above.

Example 14

Exemplary Automated Methods

Any of the methods described herein can be performed via one or more computer-readable media (e.g., storage media) having computer-executable instructions for performing such methods. Operation can be fully automatic, semi-automatic, or involve manual intervention.

Example 15

Exemplary Combinations

The technologies of any example described herein can be combined with the technologies of any one or more other examples described herein.

Example 16

Exemplary Alternatives

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer implemented method for performance tracking, the method comprising:
    monitoring performance of a computing system over a period of time, wherein the performance of the computing system is classified using four possible quadrant states;
    based on results of the performance monitoring, determining a plurality of performance states of the computing system at a corresponding plurality of monitoring times spread over the period of time, wherein the plurality of performance states are determined from the four possible quadrant states for the computing system, and wherein the four possible quadrant states are:
        a state representing low system stress and poor quality of service;
        a state representing low system stress and good quality of service;
        a state representing high system stress and good quality of service; and
        a state representing high system stress and poor quality of service;
    wherein system stress refers to hardware resource utilization of the computing system, and wherein quality of service refers to responsiveness and throughput of software of the computing system;
    based on results of the performance monitoring, determining a plurality of performance state transitions of the computing system over the period of time, wherein the plurality of performance state transitions are performance state transitions between sequential pairs of performance states of the four possible quadrant states;
    based on the plurality of performance state transitions of the computing system, making one or more capacity planning recommendations; and
    based on the plurality of performance states of the computing system, displaying an indication of health of the computing system.

2. The method of claim 1 wherein the plurality of performance state transitions are selected from a set of sixteen possible transitions between the four possible quadrant states, including self transitions.

3. The method of claim 1 wherein each performance state transition of the plurality of performance state transitions is associated with a data structure comprising:
    a beginning quadrant of the four possible quadrants and an ending quadrant of the four possible quadrants;
    one or more possible transition conditions; and
    one or more possible capacity planning recommendations.

4. The method of claim 1 further comprising:
    determining a most frequently occurring performance state transition of the plurality of performance state transitions of the computing system;
    wherein the one or more capacity planning recommendations are based on the most frequently occurring performance state transition.

5. The method of claim 1 wherein the one or more capacity planning recommendations are long-term recommendations for additional capacity expected to be needed at least three months in the future.

6. The method of claim 1 wherein the one or more capacity planning recommendations are long-term recommendations for additional hardware resources.

7. The method of claim 1 further comprising displaying the one or more capacity planning recommendations on a computer display.

8. A capacity planning framework, stored in a memory or hardware storage device of a computing device, the framework comprising:
    a performance monitoring module configured to monitor performance of one or more software applications, wherein the performance of the one or more software applications is classified using four possible quadrant states;

a quadrant tracking module configured to track performance of the one or more software applications over a period of time by determining a plurality of performance states of the one or more software applications at a corresponding plurality of monitoring times spread over the period of time, and determining a plurality of performance state transitions, between sequential pairs of the plurality of performance states, of the one or more software applications, wherein the plurality of performance state transitions are determined from a set of performance state transitions between the four possible quadrant states for the one or more software applications, and wherein the four possible quadrant states are:

a state representing low system stress and poor quality of service;

a state representing low system stress and good quality of service;

a state representing high system stress and good quality of service; and a state representing high system stress and poor quality of service;

wherein system stress refers to hardware resources on which the one or more software applications are running, and wherein quality of service refers to responsiveness and throughput of the one or more software applications; and a capacity planning module configured to provide capacity planning recommendations based on the plurality of performance state transitions determined by the quadrant tracking module;

wherein the capacity planning frameworks is an automated framework implemented by the computing device.

9. The framework of claim 8 wherein the quadrant tracking module is further configured to determine a most frequently occurring performance state transition of the plurality of performance state transitions of the one or more software applications.

10. The framework of claim 8 wherein the set of performance state transitions are sixteen possible transitions between the four possible quadrant states, including self transitions.

11. The framework of claim 8 wherein each performance state transition of the set of performance state transitions is associated with a data structure comprising:

a beginning quadrant of the four possible quadrants and an ending quadrant of the four possible quadrants;

one or more possible transition conditions; and one or more possible capacity planning recommendations.

12. The framework of claim 8 wherein the period of time is at least twelve hours.

13. The framework of claim 8 wherein the performance monitoring module, quadrant tracking module, and capacity planning module are configured to operate without user intervention to provide an end-to-end solution for providing capacity planning recommendations.

14. A computer implemented method for providing capacity planning recommendations, the method comprising:

monitoring performance of a software application over a period of time, wherein the performance of the software application is classified using four possible pre-defined quadrant states;

based on results of the performance monitoring, determining a plurality of performance states of the software application at a corresponding plurality of monitoring times spread over the period of time, wherein the plurality of performance states are determined from the four possible pre-defined quadrant states for the software application;

based on the plurality of performance states, determining a plurality of performance state transitions of the software application over the period of time, wherein the plurality of performance state transitions are selected from a set of possible performance state transitions between the four possible quadrant states for the software application, and wherein the four possible quadrant states are:

a state representing low system stress and poor quality of service;

a state representing low system stress and good quality of service;

a state representing high system stress and good quality of service; and a state representing high system stress and poor quality of service;

wherein system stress refers to hardware resources on which the software application is running, and wherein quality of service refers to responsiveness and throughput of the software application;

determining a most frequently occurring performance state transition of the plurality of performance state transitions of the software application; and based on the most frequently occurring performance state transition, making one or more capacity planning recommendations.

15. The method of claim 14 wherein the one or more capacity planning recommendations are long-term recommendations for additional capacity expected to be needed at least three months in the future.

* * * * *